March 28, 1967  J. J. FANUZZI ET AL  3,311,525
HEAT SEALING APPARATUS INCLUDING A POROUS
MEMBER AND FLUID PRESSURE
Filed Oct. 2, 1963

INVENTORS
JAMES J. FANUZZI
WILLIAM L. CALVERT

BY

ATTORNEY

3,311,525
HEAT SEALING APPARATUS INCLUDING A POROUS MEMBER AND FLUID PRESSURE
James J. Fanuzzi, Pompton Plains, and William L. Calvert, Westfield, N.J., assignors to Union Carbide Corporation, a corporation of New York
Filed Oct. 2, 1963, Ser. No. 313,340
10 Claims. (Cl. 156—497)

This invention relates to heat sealing. More specifically, this invention relates to a device for heat sealing thermoplastic material, particularly thermoplastic film.

It is the practice in the art of heat sealing non-thermoplastic materials such as paper, cellophane and the like, to coat these materials with a heat sealing substance such as wax or some similar substance. Heat sealing is then accomplished by bringing a heated sealing element into direct contact with a non-thermoplastic material coated with a heat sealing substance thereby producing a heat seal. Here the non-thermoplastic material is unaffected by the sealing operation. However, the case has been found to be just the opposite with thermoplastic material. The use of this "direct contact method" to heat seal thermoplastic material causes the thermoplastic material to burn and char and stick to the heated sealing element, and results in the formation of holes in the thermoplastic material and of generally weak, unacceptable seals, or only partial seals or even no seal at all in extreme cases.

Because of the increased commercial use of thermoplastic materials in recent years, and particularly in the use of thermoplastic film such as polyethylene and polypropylene film for wrapping purposes, a method for heat sealing thermoplastic material which would be free from the inherent drawbacks of the aforementioned "direct contact method" and which would produce commercially acceptable heat seals has been sought.

One method proposed has been to interpose a heat transfer element, generally a sheet of polytetrafluoroethylene or fiber glass cloth impregnated with polytetrafluoroethylene, between a heated sealing element and the thermoplastic material being heat sealed. Here, the heat transfer element is used to prevent the thermoplastic material from sticking to the heated sealing element and is itself non-sticking with respect to a hot or fused thermoplastic material. However, because of the high temperatures used to heat seal thermoplastic materials, and because of the direct contact of the heat transfer element with the heated sealing element, the heat transfer element becomes degraded and often has to be replaced after a relatively short period of use. To conserve the heat transfer element, lower sealing temperatures are used, but this results in an undesirable slow-down of the sealing operation. In addition, the surface of a thermoplastic material in the area of a heat seal produced by this "heat transfer element method" becomes undesirably distorted by virtue of the direct contact of the heat transfer element as it moves over the surface of a thermoplastic material.

To cope with this last mentioned drawback, it has been proposed to provide for relative non-motion between the heat transfer element and a thermoplastic material being heat sealed. A heated moving belt or the like coated or impregnated with polytetrafluoroethylene serves this purpose. But, it has been found that this method, while somewhat reducing undesirable surface distortion, does not eliminate the same. This method also results in undesirable surface distortion due to direct contact with the heated moving belt. It is to be noted that this "moving belt method" is also subject to the same difficulties as the aforementioned "heat transfer element method" with respect to heat degradation of the moving belt and slow-down of the sealing operation due to the use of lower sealing temperatures.

It can be seen then that the aforementioned proposed methods for heat sealing thermoplastic material suffer from serious difficulties in that (1) they result in undesirable surface distortion of a thermoplastic material, (2) are uneconomical with respect to the materials used to carry out the methods, and (3) are inefficient with respect to the time required to perform the methods.

The present invention provides a method and device for heat sealing thermoplastic material which are free of the inherent drawbacks of the aforementioned "direct contact method" of heat sealing, and which overcome difficulties presented by the aforementioned "heat transfer element" and "moving belt" methods for heat sealing thermoplastic material. The method and device of the present invention are economical, efficient in that acceptable seals can be produced quickly over a wide temperature range, do not adversely affect the surface of a heat sealed thermoplastic material, and produce highly superior and commercially acceptable heat seals. The devices of the present invention are also capable of being easily installed in existing or new heat sealing machines adapted to heat seal non-thermoplastic materials.

The phrase "heat sealing thermoplastic material" as used herein means that a ply of thermoplastic film, generally having a thickness of from about 0.1 mil to about 10 mils, becomes bonded without the use of an adhesive to a second ply or plies of thermoplastic film or to a thermoplastic sheet or article, by the application of heat. It is to be understood that thermoplastic materials can be heat sealed in an overlapping or edge to edge relationship by the method and device of the present invention.

Broadly, the method of the present invention for heat sealing thermoplastic material comprises bringing a thermoplastic material to be heat sealed into close proximity with a porous member, maintaining a thin layer of fluid, which preferably contains a lubricant, between the thermoplastic material and the porous member, principally to prevent direct contact between the two, while maintaining the porous member at a temperature such that the thermoplastic material is heat sealed. A device contemplated by the present invention as being suitable for carrying out the instant method broadly comprises a porous member having a pore size of from about 1 micron to about 50 microns, preferably from about 2 microns to about 25 microns, and a thickness of from about 0.003 inch to about 1 inch, preferably from about 0.1 inch to about 0.5 inch, means to maintain a thin layer of fluid between a thermoplastic material to be heat sealed and the porous member, and means to heat the porous member.

The present invention will be more fully understood from the description which follows taken in conjunction with the accompanying drawings wherein.

Figure 1:
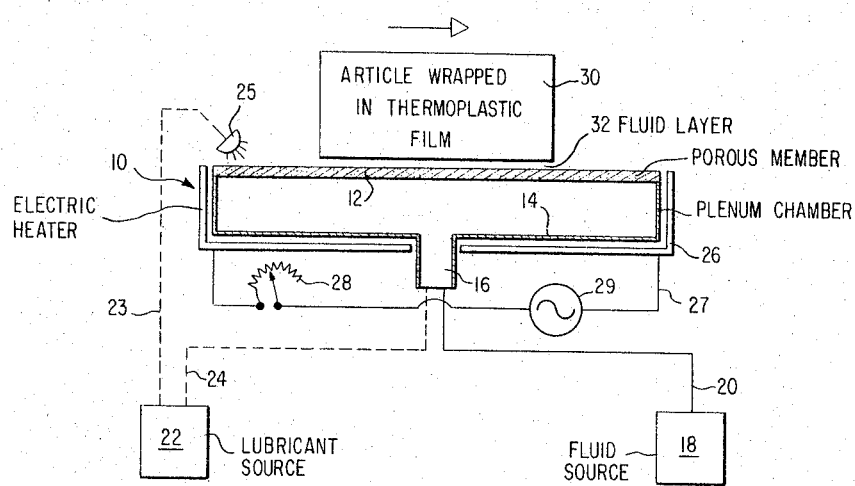
FIGURE 1 is a schematic drawing of one embodiment of the device of the present invention which is suitable for carrying out the method of the present invention.

Referring now to the drawings, wherein like parts bear like reference numerals, there is shown in FIGURE 1, for purposes of illustration, a device which is adapted to heat seal thermoplastic film wrapped about an article, such as a package, in accordance with the method of the present invention. There is shown in FIGURE 2, again by way of illustration, a modified device which is adapted to heat seal thermoplastic film in accordance with the method of the present invention.

Figure 2:
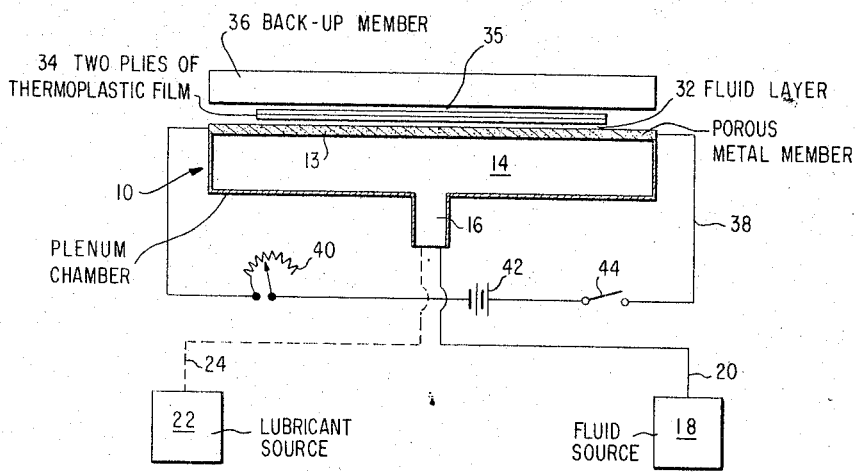
FIGURE 2 is a schematic drawing of another embodiment of the device of the present invention which is suitable for carrying out the method of the present invention.

The heat sealing device is indicated generally by the reference numeral 10 and is shown to include porous member 12 shown in FIGURE 1, or porous metal member 13 shown in FIGURE 2, disposed over and connected to plenum chamber 14 having a centrally positioned inlet 16. The character of porous members 12 and 13 will be more fully described below. A suitable fluid is fed from fluid source 18 through line 20 into plenum chamber 14 through inlet 16. Similarly, when the use of a lubricant is desired, the same can be continuously or intermittently fed from lubricant source 22 thru line 24 into plenum chamber 14 thru inlet 16. The character of the fluid and lubricant will be more fully described below. In the device shown in FIGURE 1, lubricant in place of or in addition to the lubricant fed into plenum chamber 14 may be fed thru line 23 from source 22 to be continuously or intermittently dispensed onto the surface of porous member 12 thru suitable means, such as a nozzle or spray head indicated by the reference numeral 25.

Suitable means are provided to convey a fluid, and lubricant when used, from sources 18 and 22 into plenum chamber 14 and to force a fluid or fluid and lubricant thru porous member 12 or 13 from plenum chamber 14 in such a manner that a fluid or fluid and lubricant will continuously and uniformly exude from the upper surface of porous member 12 or 13.

In the device shown in FIGURE 1, article 30 wrapped in thermoplastic film provides the necessary back-up for the heat sealing operation. Where a single ply of thermoplastic film is being heat sealed to one or more plies or to a thermoplastic article which does not provide the necessary degree of back-up, a back-up member may be provided as is indicated in FIGURE 2 by reference numeral 36. According to the present invention, back-up member 36 may itself be porous and be connected to means to force a fluid thru it towards porous metal member 13 in the manner described above. If a porous back-up member is provided, it is preferably of the same configuration as porous member 13, but may be of any desired configuration depending on the ultimate end use of the heat sealing device. Back-up member 36 when not porous may be coated with polytetrafluoroethylene or glass fiber cloth impregnated or coated with the same resin and have a configuration as previously discussed. The nature of back-up members of the present invention is such that they prevent sticking of heat sealed thermoplastic material to a back-up member.

Suitable means are provided to continuously or intermittently heat and maintain porous members 12 and 13 at a temperature sufficient to heat seal a thermoplastic material, generally from about 100° C. to about 320° C. For example, fluid from source 18 may be heated at the source or during transfer from source 18 to plenum chamber 14 thru line 20. The heated fluid then heats and maintains porous member 12 or 13 at a temperature sufficient to heat seal a thermoplastic material. Lubricant from source 22 may also be heated prior to entry into plenum chamber 14 if desired.

Another example of suitable heating means is shown in FIGURE 1 as a radiant electric heater indicated by the reference numeral 26. Line 27 carries electric current from a convenient source, as for example, alternating current source 29 to heat heater 26, and means are provided to control the amount of heating, as for example, by rheostat 28. Here, heat is radiated from the element 26 to continuously heat plenum chamber 14, fluid in the plenum chamber, and porous member 12 during periods of operation.

Yet another example of suitable heating means is shown as electric resistance heating means in FIGURE 2 wherein electric current is continuously or intermittently passed thru porous metal member 13 to directly heat the same. Current is carried by line 38 from a suitable source such as battery 42, and a rheostat 40 or similar means is provided to regulate the amount of heating. Switch 44 or the like is also provided for intermittently or continuously passing current thru porous metal member 13.

In the discussion of the operation of the heat sealing devices which follows, the term "fluid" will be taken to mean fluid alone or fluid and lubricant.

Operation of the device shown in FIGURE 1 to carry out the method of the present invention is as follows:

Fluid fed into plenum chamber 14 is forced thru porous member 12 in such a manner that fluid continuously and uniformly exudes from the upper surface of porous member 12 as described previously. Article 30 wrapped in a thermoplastic film to be heat sealed is then brought into close proximity with porous member 12 thereby confining fluid exuding from the surface of porous member 12 whereby a thin layer of fluid 32 is maintained between the thermoplastic film and porous member 12 to prevent direct contact between the same and to substantially reduce the amount of friction or drag in those instances where a wrapped article is moved over porous member 12. Porous member 12 is maintained by electric heater 26 at a temperature such that the thermoplastic film is heat sealed while in close proximity thereto. Lubricant from spray head 25 may be continuously applied to the upper surface of porous member 12 while fluid is exuding therefrom, or may be intermittently applied while article 30 is in close proximity with porous member 12.

Operation of the heat sealing device shown in FIGURE 2 is similar to that of the device shown in FIGURE 1 and is as follows: fluid fed into plenum chamber 14 is forced thru porous metal member 13 in such a manner that fluid continuously and uniformly exudes from the upper surface of porous metal member 13 as described previously. Thermoplastic film to be heat sealed, shown in the drawing by way of illustration as two plies of overlapping film and indicated by the reference numeral 34, is then brought into close proximity with porous metal member 13 and back-up member 36 is brought into an operative position as shown in FIGURE 2. The thermoplastic film 34, when brought into close proximity with porous metal member 13, confines fluid exuding from the upper surface thereof thereby maintaining a thin layer of fluid 32 between the thermoplastic film 34 and porous metal member 13 to prevent direct contact between the same. When back-up member 36 is itself porous, fluid is forced thru the same towards porous metal member 13 in such a manner that fluid continuously and uniformly exudes from the surface of member 36. Fluid is confined and is maintained as a thin fluid layer 35 between back-up member 36 in an operative position and thermoplastic film 34 being heat sealed, to prevent direct contact between the same and to prevent sticking of hot, sealed thermoplastic film 34 to back-up member 36. As indicated above, sticking of the hot, sealed thermoplastic film 34 to the back-up member 36 can also be prevented by coating back-up member 36 with polytetrafluoroethylene or glass fiber cloth coated or impregnated with the same resin. Electric current passing thru porous metal member 13 heats and maintains the same as described previously at a temperature such that thermoplastic film 34 is heat sealed while in close proximity thereto. Switch 44 is conveniently provided to intermittently pass current thru porous metal member 13 when thermoplastic film is brought into close proximity thereto to be heat sealed. Current may also be passed continuously.

After the heat sealing operation is completed, a sealed thermoplastc material may be allowed to cool at room temperature, about 23° C., or may be quick cooled by quenching in a cold fluid bath, or applying a cold element to the seal area, and the like.

It is to be understood that the steps of forcing a fluid thru a porous member and bringing a thermoplastic material to be heat sealed into close proximity thereto, may be reversed in carrying out the method of the present invention. Also, the porous member may be brought into proximity with the thermoplastic material to be heat sealed, the opposite of that described above, in carrying out the method of the present invention. When a back-up member is used, it may be movable or stationary and be used with a movable or stationary porous member. It is also to be understood that one or more devices may be used to carry out the method of the present invention to simultaneously and/or sequentially heat seal a thermoplastic material.

Porous members used in the present invention have a pore size of from about 1 micron to about 50 microns, preferably from about 2 microns to about 25 microns, and a thickness of from about 0.003 inch to about 1 inch, preferably from about 0.1 inch to about 0.5 inch. For purposes of this invention, it is preferred that porous members be substantially uniform in pore size and thickness. In addition, porous members used in the present invention have a volumetric porosity, which is defined as the percentage of open-space volume with respect to the total volume, the value of which is not critical but is rather governed by practical considerations. For instance, volumetric porosity should not be so great as to materially effect the strength required for a particular end use, nor should it be so low as to require the use of undesirably high pressures to force a fluid thru a porous member. In general, volumetric porosity which meets these practical criteria ranges from about 25 percent to about 55 percent, preferably from about 35 percent to about 40 percent.

Porous members used in the present invention may be made of metals such as aluminum, chromium, copper, iron, magnesium, nickel, platinum, tin, tungsten, zinc, and the like, alloys such as brass, bronze, steel, stainless steel, and the like, ceramics, refractory materials such as alumina, silica, silicone carbide, tungsten carbide, zircon, and the like. Porous members may be of any size or shape desired, depending on the character of the thermoplastic material being heat sealed. For example, porous members may be square, rectangular, toroidal, round, oval, annular, and the like. The porous members may also be a porous metal or ceramic tube of any desired length and shape in cross-section. For example, porous tubes may be square, rectangular, round, oval, and the like in cross-section. These tubes are partially encased in a non-conducting, insulating material such that only a portion of the surface running the length of the porous tube is exposed. These porous tubes are heated by suitable means as described previously. One end of a tube is sealed off and fluid fed into the open end is forced thru and exudes from that portion of the tube which is exposed, and heat sealing is carried out as described previously.

Porous members may be made by a process known in the art by which a porous body is made. For example, porous members may be made by sintering metals, by point welding or soldering aggregates of small metal balls of the size of bird shot, by sintering wire matrices, and the like. Porous members may also be made according to the teachings contained in the following United States patents, which are incorporated herein by reference: 2,114,748 issued Apr. 9, 1938, 2,231,989 issued Feb. 18, 1941, 2,267,918 issued Dec. 30, 1949, 2,273,589 issued Feb. 17, 1942, 2,327,805 issued Aug. 24, 1943, 2,341,732 issued Feb. 15, 1944, 2,341,561 issued Feb. 15, 1944, and 2,386,544 issued Oct. 9, 1945. It is to be noted that porous members used in the present invention may be comprised of two or more layers of the same or different porous material having the same or different pore size.

As described previously, when a thermoplastic material to be heat sealed is brought into close proximity with a porous member from which a fluid is exuding, the exuded fluid becomes confined as a thin fluid layer between the thermoplastic material and the porous member and is maintained while they are in close proximity with each other. This feature of the present invention, as has already been pointed out, prevents direct contact of a thermoplastic material with a porous member and substantially reduces drag due to friction when a thermoplastic material is passed over a porous member. The present invention is further characterized by another equally desirable feature which is described as follows. It has been observed that when a thermoplastic material is brought into close proximity with a porous member from which a fluid is exuding, the rate of flow of a fluid from the surface of a porous member and the pressure on the opposite side of a porous member causing a fluid to so flow, remain constant, uniform and substantially undiminished over the entire surface area of the porous member during the entire heat sealing operation. The aforementioned rate of flow and pressure will be more fully described below. This feature permits efficient temperature control, reduces heat losses to an economically tolerable level, and allows for the production of distortion free heat seals. The behavior of a fluid layer during the heat sealing operation is attributable to porous members used in the present invention. The character of porous members as described previously is critical with respect to the present invention because they provide for a mode of operation and result heretofore unattainable.

In order to demonstrate the criticality of porous members used in the present invention, a comparison in mode of operation and result was made with a perforated metal sheet having holes $\frac{1}{64}$ inch in diameter and spaced at $\frac{1}{8}$ inch intervals. This perforated sheet was substituted for porous member 12 shown in FIGURE 1. Hot air under a pressure of 2 p.s.i. in plenum chamber 14 was allowed to flow thru the perforated sheet. A package weighing 8 ounces and wrapped in thermoplastic film was then brought into close proximity thereto under its own weight and it was observed that the package and film came into direct contact with the hot perforated metal sheet with the undesirable results obtaining as discussed previously with respect to the direct contact method of heat sealing. In this instance, the hot air was not confined as a fluid layer because the air took the path of least resistance and flowed thru those perforations not covered by the package and open to the atmosphere. With a porous member, on the other hand, having a pore size of 25 microns and a thickness of $\frac{1}{16}$ inch and operating under the same conditions as described with respect to the perforated metal sheet, it was observed that when a package again weighing 8 ounces and wrapped in thermoplastic film was brought into close proximity with the porous member under its own weight, the fluid exuding from the porous member became confined as a thin fluid layer between the film and the porous member thereby preventing direct contact between the two. In this instance, the hot air, because of the character of the porous member, cannot take a path of lesser resistance but continues to flow uniformly and constantly and is substantially undiminished during the heat sealing operation. Stated in different terms, the package and film has substantially no effect on the fluid flow from the surface of a porous member nor on the pressure causing this flow during the heat sealing operation.

Returning to the example of the perforated metal sheet, the pressure in plenum chamber 14 was increased to 10 p.s.i. and it was observed that the package and film was able to float over the perforated sheet under its own weight. However, the large volume of flow of air required to accomplish this end proved to be undesirable because the amount of heat lost renders the process inefficient and uneconomical, and undesirably heats up the surrounding apparatus and work area. It was also found that proper temperature control to effect good heat seals was extremely difficult under these conditions. Furthermore, this large volume of flow of air agitates the soft film being heat sealed and causes undesirable distortions to appear in the area of the heat seal. In this example, the flow of air thru the perforated sheet is not uniform over the entire surface area of the package. The weight of the package causes the volume of flow of air to decrease thru those perforations covered by the package and increase thru those perforations not covered and open to the atmosphere. This only tends to compound the undesirable effects created by the large volume of flow of air. On the other hand, proper temperature control is readily attainable with the porous members of the present invention and heat losses are held to a tolerable level. As has been previously pointed out, this is due to the character of porous member used in the present invention in that the rate and uniformity of flow of a fluid from the surface of a porous member is substantially unaffected by the thermoplastic material being heat sealed.

The amount of pressure required to force a fluid thru a porous member such that the fluid exudes from the surface thereof is not critical and is governed by the character of the porous member and the particular end use to which it is put. For purposes of this invention, it is preferred that a pressure be used which causes a fluid to exude from the surface of a porous member at a rate of from about 1 cubic foot per minute per square foot of surface area (c.f.m./ft.$^2$) to about 100 c.f.m./ft.$^2$, preferably from about 2 c.f.m./ft.$^2$ to about 50 c.f.m./ft.$^2$. Generally, the pressure required to accomplish this will vary over a range of from about 0.05 p.s.i. to about 500 p.s.i., preferably from about 0.5 p.s.i. to about 200 p.s.i.

It is generally understood that when sufficient heat in one form or another is applied to a thermoplastic material, the same becomes bonded thereby producing a heat seal. In the present invention, it is believed that the heat which causes a thermoplastic material to heat seal is a combination of radiant heat from a heated porous member, and conducted heat from a fluid layer which is in contact with a thermoplastic material being heat sealed. This theory is presented as the most likely explanation of what occurs, and is not intended to limit the present invention in any manner.

The term fluid used herein is intended to encompass both liquids and gases. Suitable fluids to be used in the present invention are those which are inert with respect to the thermoplastic material being heat sealed and with respect to the temperatures used in the heat sealing operation. Illustrative of suitable gases are air, steam, nitrogen, argon, carbon dioxide, and the like, with air being preferred for economic reasons. Suitable liquids may be volatile or non-volatile, among which are low viscosity oils such as mineral oil, and the like, glycols, silicones, and the like.

Likewise, the term lubricant is intended to encompass both gaseous and liquid lubricants. Suitable lubricants are those which are inert with respect to the thermoplastic material being heat sealed and with respect to the temperatures used in the heat sealing operation. Among suitable lubricants are polyalkylene glycols and derivatives thereof, dimethyl silicones, polysiloxanes, silicone oils, and the like, with polysiloxanes being preferred. It is to be understood that the aforementioned fluid can itself be a lubricant and can be used in the manner described for a fluid.

It is to be noted that a fluid may contain an adhesive which is applied to be a thermoplastic material during the sealing operation for later use, as in a label applying operation, or to augment the heat seal to produce a stronger seal.

EXAMPLES

The following examples are given to further illustrate the present invention and are not intended to limit the same in any manner.

*Example 1*

The device shown in FIGURE 1 was used without a lubricant source. The fluid used was air which was forced under a pressure of 20 p.s.i. thru a porous bronze plate having a pore size of from 20 to 25 microns and a thickness of 0.125 inch. The porous bronze plate was maintained at a temperature of 120° C. while a package wrapped in polypropylene film 1 mil thick was passed over the porous bronze plate in close proximity thereto by hand. A strong, commercially acceptable heat seal was effected without any appreciable surface distortion of the polypropylene film in the area of the heat seal.

*Example 2*

The device shown in FIGURE 1 was used. Air under a pressure of 20 p.s.i. was forced thru a porous bronze plate as described in Example 1. A lubricant, dimethyl polysiloxane, was continuously applied thru a nozzle to the surface of the porous bronze plate. The porous bronze plate was maintained at temperatures of 100° C., 120° C. and 150° C. at separate intervals and at each temperature, a package wrapped in polypropylene film 1 mil thick was passed over the plate in close proximity thereto by hand. In each instance strong, commercially acceptable heat seals were effected without any surface distortion of the polypropylene film in the area of the heat seal.

This example illustrates the wide temperature range over which the method and device of the present invention are operable.

*Example 3*

The conditions and procedure of Example 2 were duplicated except that dimethyl polysiloxane lubricant was intermittently applied once every minute for 3 seconds to the surface of the porous bronze plate. Heat seals were effected as in Example 2 which were strong and commercially acceptable, and the polypropylene film was free of any surface distortion in the area of the heat seal.

What is claimed is:

1. A device for heat sealing thermoplastic material brought into close proximity thereto which comprises a porous member having a pore size of from about 1 micron to about 50 microns and a thickness of from about 0.003 inch to about 1 inch, means to force a fluid thru said porous member whereby a thin layer of said fluid is maintained between said thermoplastic material and said porous member and whereby the rate of flow of said fluid from the surface of said porous member remains constant, uniform and substantially undiminished over the entire surface area of said porous member during the entire heat sealing operation, and means to heat said porous member and said fluid.

2. The device defined in claim 1 wherein said porous member has a pore size of from about 2 microns to about 25 microns and a thickness of from about 0.1 inch to about 0.5 inch.

3. The device defined in claim 1 wherein said porous member is ceramic.

4. The device defined in claim 1 wherein said porous member is metal.

5. The device defined in claim 4 wherein said porous metal member is bronze.

6. The device defined in claim 4 wherein said porous metal member is sintered brass.

7. The device defined in claim 1 which includes a porous back-up member spaced opposite said porous member, and means to force a fluid thru said porous back-up member in the direction of said porous mmeber.

8. The device defined in claim 1 which includes a polytetrafluoroethylene coated back-up member spaced opposite said porous member.

9. A device for heat sealing thermoplastic material brought into close proximity thereto which comprises a porous member having a pore size of from about 1 micron to about 50 microns and a thickness of from about 0.003 inch to about 1 inch, said porous member being disposed over and connected to a plenum chamber, means to introduce a fluid into said plenum chamber under positive pressure, means to force said fluid in said plenum chamber thru said porous member whereby a thin layer of said fluid is maintained between said thermoplastic material and said porous member and whereby the rate of flow of said fluid from the surface of said porous member remains constant, uniform and substantially undiminished over the entire surface area of said porous member during the entire heat sealing operation, and means to heat said porous member and said fluid.

10. A device for heat sealing thermoplastic material brought into close proximity thereto which comprises a porous metal member having a pore size of from about 1 micron to about 50 microns and a thickness of from about 0.003 inch to about 1 inch, means to force a fluid thru said porous metal member whereby a thin layer of said fluid is maintained between said thermoplastic material and said porous member and whereby the rate of flow of said fluid from the surface of said porous member remains constant, uniform and substantially undiminished over the entire surface area of said porous member during the entire heat sealing operation, and means for passing an electric current thru said porous metal member whereby said member and said fluid are heated.

References Cited by the Examiner
UNITED STATES PATENTS

| | | | |
|---|---|---|---|
| 2,837,623 | 6/1958 | Judson et al. | 219—381 |
| 2,987,118 | 6/1961 | Brown | 158—99 |
| 3,049,795 | 8/1962 | Valti | 158—99 |
| 3,084,489 | 4/1963 | Seefluth | 156—497 |
| 3,087,041 | 4/1963 | Vonk | 158—99 |
| 3,193,406 | 7/1965 | Mittelman | 156—497 |

FOREIGN PATENTS 691,430 5/1940 Germany.

References Cited by the Applicant
FOREIGN PATENTS 114,269 12/1941 Australia.

EARL M. BERGERT, *Primary Examiner.*

DOUGLAS J. DRUMMOND, *Examiner.*